United States Patent
Becker

(10) Patent No.: US 10,527,048 B2
(45) Date of Patent: Jan. 7, 2020

(54) SUBMERSIBLE PUMP AND BEARING ARRANGEMENT

(71) Applicant: Sulzer Management AG, Winterthur (CH)

(72) Inventor: Klaus Becker, Bergisch Gladbach (DE)

(73) Assignee: SULZER MANAGEMENT AG, Winterthur (CH)

( * ) Notice: Subject to any disclaimer, the term of this patent is extended or adjusted under 35 U.S.C. 154(b) by 652 days.

(21) Appl. No.: 14/982,514

(22) Filed: Dec. 29, 2015

(65) Prior Publication Data

US 2016/0201685 A1 Jul. 14, 2016

(30) Foreign Application Priority Data

Jan. 13, 2015 (EP) .................................... 15151015

(51) Int. Cl.
*F04D 29/049* (2006.01)
*F04D 13/08* (2006.01)
(Continued)

(52) U.S. Cl.
CPC .......... *F04D 29/049* (2013.01); *F04D 13/08* (2013.01); *F16C 19/541* (2013.01);
(Continued)

(58) Field of Classification Search
CPC ...... F16C 19/52; F16C 19/541; F16C 19/542; F16C 19/547; F16C 33/80; F16C 33/82;
(Continued)

(56) References Cited

U.S. PATENT DOCUMENTS 5,273,413 A * 12/1993 Wallin .................... F01C 21/02
384/516
5,409,359 A * 4/1995 Takano ................... F01C 21/02
384/516
(Continued)

FOREIGN PATENT DOCUMENTS

CN 2038299 U 5/1989
CN 2162030 Y 4/1994
(Continued)

OTHER PUBLICATIONS

Extended European Search Report dated Jul. 16, 2015 in European Patent Application 15151015.3 filed Jan. 13, 2015.

*Primary Examiner* — James Pilkington
(74) *Attorney, Agent, or Firm* — Global IP Counselors, LLP

(57) ABSTRACT

A submersible pump includes a bearing arrangement and a rotor shaft. The bearing arrangement includes a bearing cover, a bearing flange, and one or more bearing elements, each bearing element having an inner bearing ring, an outer bearing ring and a roller element. The rotor shaft is rotatably supported in the one or more bearing element about an axis of rotation extending in a longitudinal axial direction so that the inner bearing ring is configured to rotate along with the rotor shaft in an operating state. The bearing element is arranged at the bearing flange such that the bearing cover tensions each outer bearing ring in a longitudinal axial direction and such that a peripheral gap having a predefined axial width is formed in a radial direction between the outer bearing ring and the bearing cover and between the outer bearing ring and the bearing flange.

16 Claims, 2 Drawing Sheets

(51) Int. Cl.
    *F16C 35/067*   (2006.01)
    *H02K 5/136*    (2006.01)
    *H02K 5/173*    (2006.01)
    *F16C 19/54*    (2006.01)

(52) U.S. Cl.
    CPC ............ F16C 35/067 (2013.01); H02K 5/136 (2013.01); H02K 5/1732 (2013.01)

(58) Field of Classification Search
    CPC ...... F16C 35/045; F16C 35/067; F04D 13/08; F04D 15/0077
    See application file for complete search history.

(56) References Cited

U.S. PATENT DOCUMENTS 6,102,574 A      8/2000   Proschel et al.
9,140,304 B2 *   9/2015   Hain ..................... F16C 33/80

FOREIGN PATENT DOCUMENTS

| CN | 101924405   | A  | 12/2010 |
| CN | 102290941   | A1 | 12/2011 |
| DE | 102778      | A1 | 12/1973 |
| DE | 2901111     | *  | 7/1980  |
| DE | 19546023    | A1 | 8/1996  |
| DE | 102012202267| A1 | 8/2013  |
| EP | 2249042     | A1 | 11/2010 |
| EP | 2381119     | A  | 10/2011 |

\* cited by examiner

SUBMERSIBLE PUMP AND BEARING ARRANGEMENT

CROSS-REFERENCE TO RELATED APPLICATIONS

This application claims priority to EP Application No. 15151015.3, filed Jan. 13, 2015, the contents of which is hereby incorporation herein by reference.

FIELD OF THE INVENTION

The invention relates to a submersible pump comprising a bearing arrangement. In particular, the invention relates to a submersible pump comprising a bearing arrangement with a bearing cover and one of more bearing elements.

BACKGROUND OF THE INVENTION

Known submersible pumps have a large number of precision components which require precise alignment, assembly and interaction among one another. Such known submersible pumps comprise a pump housing, a motor part having an electric motor arranged in a motor housing and having a hydraulic part with a pump wheel as well as having a shaft leadthrough which is arranged between the motor part and the hydraulic part and which is passed through by a rotor shaft.

The submersible pump pumps a pump fluid, for example a water or a waste water, wherein a gas, in particular a flammable gas, which can be distributed about the submersible pump, can arise in dependence on the use of the submersible pump, for example in fermentation processes. On operating disturbances, overheating may arise and ignition sources can be produced in the pump, for example due to spark formation on a short-circuit. If these sparks escape from the pump, they can ignite the gas and damage or destroy the structure in which the pump is installed, such as the pump, and the submersible pump. Submersible pumps can thus only be operated in environments with a flammable atmosphere with special protective measures for safety reasons.

A submersible pump is described in EP 2 249 042 A1 which at least partly surrounds a support tube with an insulating peripheral protective jacket so that a part region of the support tube is insulated thermally and by material from the environment, in particular from the pump fluid and the gas. Such a protective jacket can in particular be provided in the region of a bearing arrangement so that a direct insulation of the particularly risk-intensive bearing region is present. Other measures provide the formation of a gap in the bearing arrangement, for example between a bearing flange and a bearing cover.

SUMMARY

The disadvantage of this apparatus is that it is very complex and expensive in manufacture from a construction aspect since additional components have to be designed and manufactured which make the bearing arrangement unnecessarily complicated. In addition, more installation space is required in the submersible pump.

Other measures provide a formation of a gap between the bearing cover and the bearing flange, which makes anther construction configuration of the bearing cover and/or of the bearing flange necessary which is unnecessarily expensive and complicated. The centration of the bearing cover can thereby be made unnecessarily complicated since it takes place, for example, at the bearing flange, with a spacing having to be present from the bearing elements, in particular from the bearing element directly at the bearing flange and/or at the bearing cover, to compensate concentricity errors. In addition, due to the constructionally complicated design of the bearing cover, it may also be important to design a bearing element, in particular the bearing element arranged directly at the bearing flange and/or at the bearing cover, differently by an order of magnitude and/or additionally to fasten it, for example by a holding element, to the bearing cover and/or to the bearing flange.

It is a disadvantage that an increased load on the bearing element may occur, and thus wear, due to the concentricity errors. In addition, for example, an additional holding means or device has to be provided at the bearing cover and/or at the bearing flange, for example an O ring, to hold and fix the bearing element which is arranged directly at the bearing flange and/or at the bearing cover, in particular an outer bearing ring of this bearing element.

It is therefore an object of the present invention to propose a submersible pump and a bearing arrangement which has a simple design from a construction aspect and which can be manufactured inexpensively and which in particular avoids the aforesaid disadvantages.

This object is satisfied by a submersible pump having the features described herein.

Additional particularly advantageous embodiments of the invention are further described herein.

In accordance with the invention, a submersible pump is proposed comprising a bearing arrangement having a bearing cover and a bearing flange and having one or more bearing elements each having an inner bearing ring, an outer bearing ring and a roll element. The submersible pump further comprises a rotor shaft which is rotatably supported in the bearing element about an axis of rotation extending in a longitudinal axis direction such that the inner bearing ring rotates along with the rotor shaft in the operating state. In this respect, the bearing element is arranged at the bearing flange such that the bearing cover tensions each outer bearing ring in the longitudinal axial direction and such that a peripheral gap having a predefinable axial width is formed in a radial direction between the outer bearing ring and the bearing cover and between the outer bearing ring and the bearing flange.

The submersible pump can, as already mentioned, comprise a pump housing having a pump wheel arranged therein and can comprise a motor housing placed onto the pump housing and having an electric motor which is arranged therein and which drives the pump wheel via a rotor shaft. The motor housing with the electric motor arranged therein and the other devices required to operate the electric motor can be called a motor part for reasons of simplicity. The pump housing and the pump wheel can be called a hydraulic part. The submersible pump can be operated in a power range up to approximately 1 MW and at a pressure, for example, of up to 10 bar. In addition, the submersible pump can be used in industrial applications, for example in the conveying of industrial waste waters or as a process pump. A submersible pump is to be understood as a pump which is designed such that, when the submersible pump is arranged partly or completely in a liquid, for example in water, this pump can be operated reliably and permanently. The submersible pump can therefore be flooded partly or completely for a specific time period or also permanently in the operating state, that is it can be arranged in a liquid, with a reliable operation of the pump simultaneously being possible. The submersible pump can, however, also be operated when it is not flooded, that is when it is not arranged in a liquid.

The shaft leadthrough can be arranged between the motor part and the hydraulic part; the shaft leadthrough can in particular be formed by the bearing cover and the bearing arrangement can be passed through by the rotor shaft. In precise terms, the rotor shaft is rotatably supported in the one or more bearing elements about the axis of rotation extending in the longitudinal axial direction so that the inner bearing ring rotates along with the rotor shaft in the operating state.

The bearing arrangement comprises the bearing cover and the bearing flange, with the bearing cover being fastenable to the bearing flange; for example, being able to be screwed on by means of one or more screws. One or more bearing elements can be arranged at the bearing flange. One or more bearing elements in this respect each comprise an inner bearing ring, an outer bearing ring and a roller element. For this purpose, a bearing chamber, for example, a recess, preferably a cylindrical bore, can be present at the bearing flange and one or more bearing elements, can be arranged therein and can in particular be arranged with an exact fit. A plurality of bearing elements can also be arranged behind one another at the bearing flange, that is in the longitudinal axial direction. One or more inner bearing rings and one or more outer bearing rings can in this respect be arranged axially in a row. The roller elements can be arranged in a region between the respective inner bearing rings and the outer bearing rings. The bearing chamber and/or the bearing elements can be filled with a lubricant and/or a coolant for lubricating and/or cooling the bearing elements; the lubricant and/or coolant can in particular flow into the region between the inner bearing ring and the outer bearing ring and can thus lubricate and cool the roller elements. However, further bearing units, for example a bearing sleeve, can also be arranged at the bearing flange, in particular in the bearing chamber.

One or more bearing elements can be arranged at the bearing flange such that the bearing cover tensions each outer bearing ring in the longitudinal axis direction. For this purpose, the bearing cover exerts a holding force in the longitudinal axial direction onto the outer bearing ring, in particular onto an end face of the outer bearing ring, while the outer bearing ring is simultaneously held at the bearing flange or while a compression force of equal amount countering the holding force acts from the bearing flange so that the bearing cover tensions the outer bearing ring of the bearing element in the longitudinal axial direction. That surface which can be oriented in the direction of the bearing cover can in this respect be understood as the end face. However, a further end face can equally be provided at the outer bearing ring, with that surface which can be oriented in the direction of the bearing flange being able to be understood as the further end face. A support surface can then be provided at the bearing cover and a further support surface can be provided at the bearing flange, with the end face lying on the support surface and the further end face lying on the further support surface. The support surfaces can, for example, be formed as a step.

However, a plurality of bearing elements can also be arranged next to one another at the bearing flange so that a plurality of outer bearing rings can be arranged axially in a row. In this respect, the bearing cover can, as described, exert a holding force in the longitudinal axial direction on a first outer bearing ring of a first bearing element which is arranged directly at the bearing cover and the first outer bearing ring can transmit the holding force to a second outer bearing ring of a second adjacent bearing element, while the second outer bearing ring is simultaneously held at the bearing flange or a compression force of equal amount countering the holding force acts from the bearing flange so that the bearing cover tensions the first and second outer bearing rings in the longitudinal axial direction The bearing cover can thus advantageously be seated on the outer bearing ring which is arranged directly at the bearing cover and the bearing cover can be centered at the outer bearing ring of the bearing element. With a plurality of bearing elements, the bearing cover at the outer bearing ring of the bearing element arranged directly at the bearing cover can in particular be centered, whereby the bearing cover and/or the rotor shaft is/are centered better and all the outer bearing rings are completely tensioned in the longitudinal axial direction and are thus better supported. In addition, the bearing cover can thus have a simpler construction design and can be manufactured inexpensively since, for example, only an inner machining of the bearing cover is necessary. The bearing element, in particular the bearing element which is directly arranged at the bearing cover or at the bearing flange, can additionally have the same size as all the other bearing elements and/or an additional holding element at the bearing cover and/or at the bearing flange which holds the bearing element can be dispensed with. The submersible pump thus has a simpler construction design overall and can be manufactured less expensively and avoids the disadvantages known from the prior art.

A peripheral gap having a predefinable axial width between the outer bearing ring and the bearing cover and between the outer bearing ring and the bearing flange is furthermore formed in the radial direction. The gap can therefore only be formed between the outer bearing ring and the bearing cover and between the outer bearing ring and the bearing flange. A gap having a predefinable axial width can be understood as the extent of the gap in the longitudinal axial direction, that is a length of the gap in the longitudinal axial direction. Since the gap is formed between the outer bearing ring and the bearing cover and between the outer bearing ring and the bearing flange and not as previously between parts of the bearing housing, the bearing arrangement can again be simplified from a construction aspect since a complex and/or expensive machining of the bearing housing can be dispensed with. In addition, the gap, which is inexpensive to manufacture, additionally makes possible a safe use of the submersible pump also in environments with an inflammable atmosphere since said gap can also be used as a spark gap.

In an embodiment of the invention, the gap is formed as a spark gap for explosion protection. In addition, a further peripheral gap having a predefinable axial width can additionally be formed between the bearing cover and the rotor shaft. An arc or a gap in the submersible pump, in particular in the shaft leadthrough, can thus advantageously be limited in an intrinsically safe manner to a region, to the gap and/or to the further gap which is uncritical in a safety aspect.

In an embodiment of the invention, the predefinable axial width of the gap running around in the radial direction and/or of the further peripheral gap is ≥5 mm. A radial width of the gap running around in the radial direction and/or of the further peripheral gap is ≤0.2 mm.

It is an advantage of the described measures and embodiments that the disadvantage known from the prior art, namely that gaps can only be formed by cast parts, is thus avoided and the gap and the further gap are advantageously formed by means of one or more bearing elements, in particular by means of one or more outer bearing rings. The gap can thus be manufactured simply and inexpensively since the complex and/or expensive machining of the cast parts, in particular of the bearing cover, is omitted.

In an embodiment of the invention, the bearing element is a roller element bearing, in particular a ball bearing or a cylinder roller bearing.

The invention furthermore relates to a bearing arrangement for a submersible pump. The bearing arrangement comprises a bearing cover and a bearing flange and one or more bearing elements each having an inner bearing ring, an outer bearing ring and a roller element. In this respect, the bearing element is arranged at the bearing flange such that the bearing cover tensions each outer bearing ring in the longitudinal axial direction and such that a peripheral gap having a predefinable axial width is formed in a radial direction between the outer bearing ring and the bearing cover and between the outer bearing ring and the bearing flange.

In an embodiment of the invention, the gap is formed as a spark gap for explosion protection. Provision is made as a further measure that the bearing element is a roller element bearing, in particular a ball bearing or cylinder roller bearing. The bearing arrangement can be arranged in the described submersible pump.

In an embodiment of the invention, the predefinable axial width of the gap running around in the radial direction is ≥5 mm and/or a radial width of the gap running around in the radial direction is ≤0.2 mm.

In an embodiment of the invention, a further peripheral gap having a predefinable axial width can be formed between the bearing cover and a rotor shaft in the radial direction in the operating state. The predefinable axial width of the further gap running around in the radial direction is ≥5 mm and/or the radial width of the further gap running around in the radial direction is ≤0.2 mm.

As already mentioned, the advantages of the submersible pump in accordance with the invention and of the bearing arrangement in accordance with the invention are that the bearing cover can be centered at the outer bearing ring of the bearing element or, with a plurality of bearing elements, the bearing cover can be centered at the outer bearing ring of the bearing element arranged directly at the bearing cover. The bearing cover is thereby centered better and all the outer bearing rings are completely tensioned in the longitudinal axial direction. The submersible pump and the bearing arrangement, in particular the bearing cover, can thus have a simpler design, can in particular have a simpler design from a construction aspect, and can be manufactured inexpensively. In addition, the gap and the further gap allow the operation of a submersible pump and of a bearing arrangement in an environment which requires explosion protection. The explosion protection is required when a malfunction of the submersible pump occurs, e.g. an electrical short-circuit, and the possibility associated therewith occurs of triggering the explosion of a flammable mixture. If, for example, an explosive mixture is in the submersible pump which is ignited by the short-circuit, the propagation of the explosion within the motor is admittedly possible, but the gap or gaps prevent the spark from escaping from the motor, for example into a structure where an explosive atmosphere may be present which could then be ignited.

BRIEF DESCRIPTION OF THE DRAWINGS

The invention will be explained in more detail hereinafter with reference to the drawings.

DETAILED DESCRIPTION OF THE EMBODIMENTS

Figure 1:
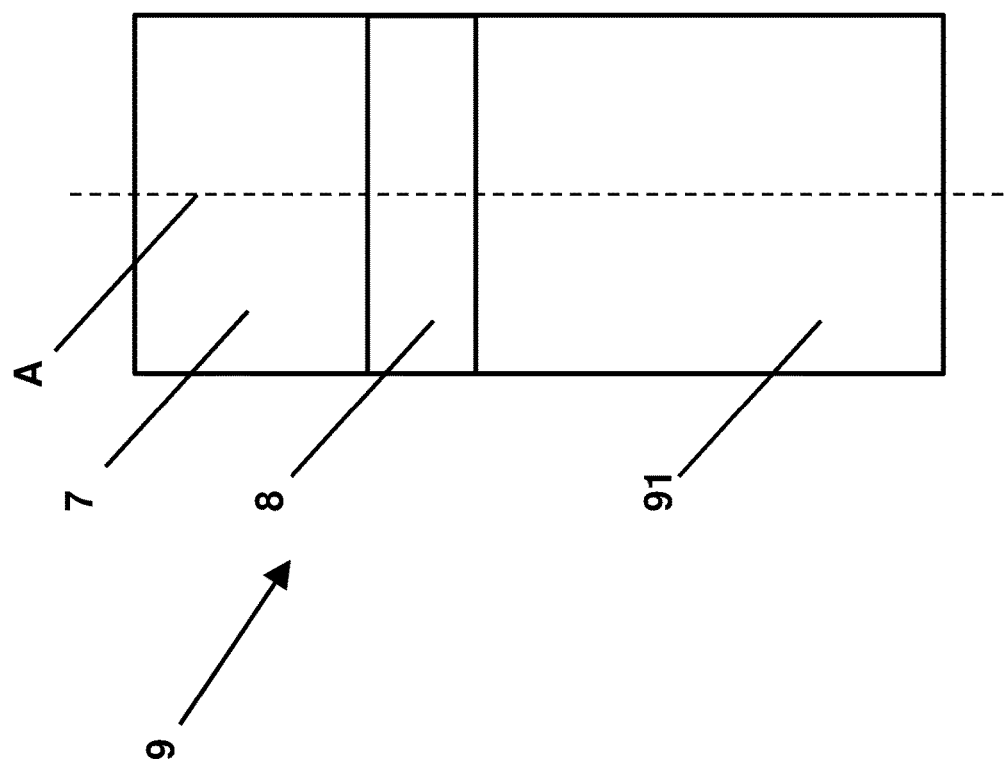
FIG. 1 is a first embodiment of a submersible pump in accordance with the invention.

FIG. 1 shows a schematic representation of a first embodiment of a submersible pump 9 in accordance with the invention. The submersible pump 9 comprises a pump housing 91 having an impeller (not shown) arranged therein and comprises a motor housing 7 placed onto the pump housing 91 and having an electric motor (not shown) which is arranged therein and which drives the impeller via a rotor shaft (not shown). A shaft leadthrough 8 is arranged between the motor housing 7 and the pump housing 91 of the submersible pump 9. The shaft leadthrough 8 is passed through by the rotor shaft, with the shaft leadthrough 8 being formed by the bearing cover (see FIG. 2).

Figure 2:
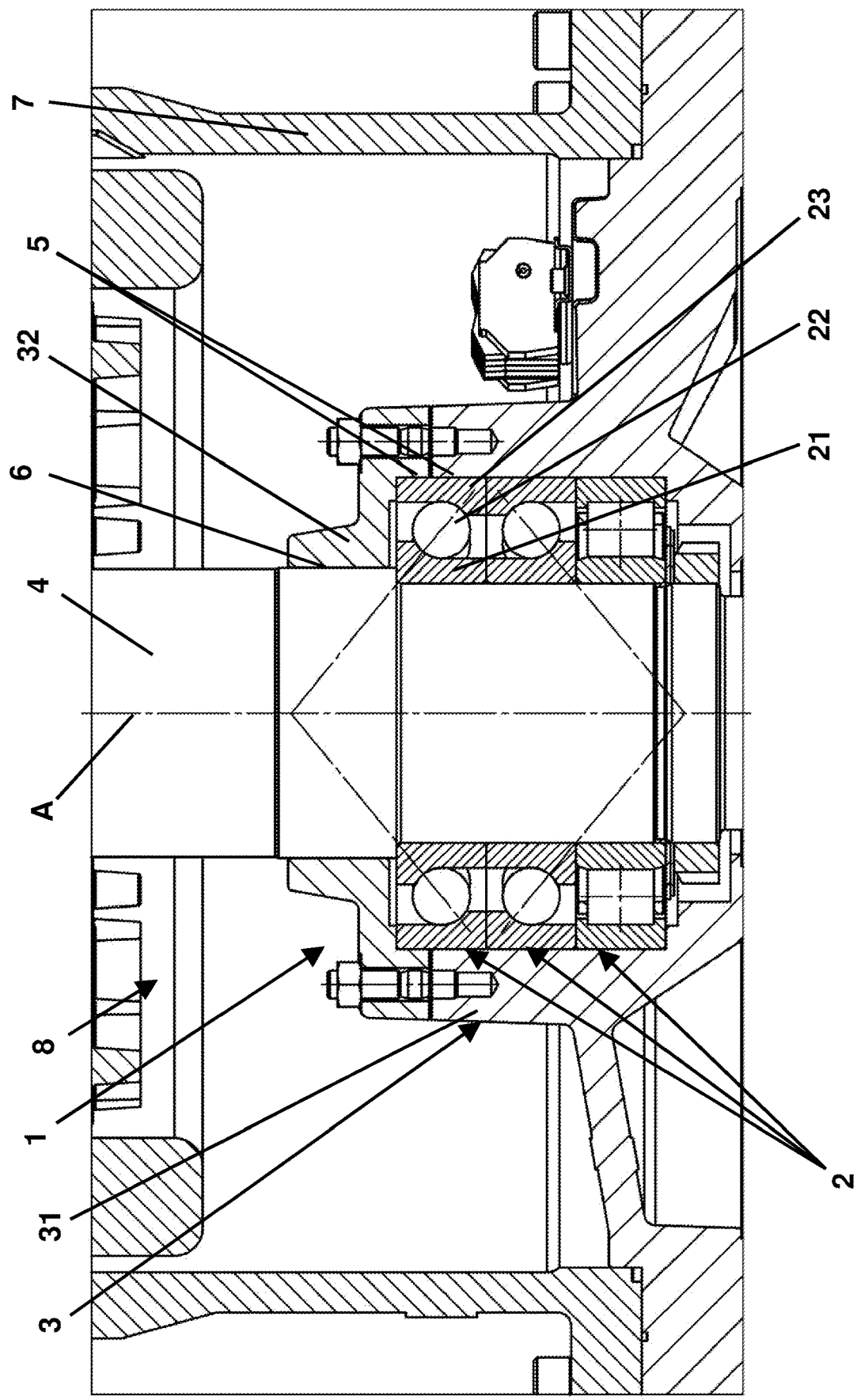
FIG. 2 is a first embodiment of a bearing arrangement in accordance with the invention

FIG. 2 shows a schematic representation of a first embodiment of a bearing arrangement 1 in accordance with the invention which is arranged in a submersible pump 9 in accordance with the invention. The rotor shaft 4 is rotatably supported in a bearing element 2 about the axis of rotation A extending in a longitudinal axial direction, with an inner bearing ring 21 rotating along with the rotor shaft 4 in the operating state. The bearing arrangement 1 for a submersible pump comprises a bearing housing 3 having a bearing cover 32 and a bearing flange 31 and comprises one or more bearing elements 2 each having an inner bearing ring 21, an outer bearing ring 23 and a roller element 22. The bearing element 2 is arranged at the bearing flange 31 such that the bearing cover 32 tensions each outer bearing ring 23 in a longitudinal axial direction and such that a peripheral gap 5 having a predefinable axial width is formed in a radial direction between the outer bearing ring 23 and the bearing cover 32 and between the outer bearing ring 23 and the bearing flange 31.

The gap 5 is in particular formed as a spark gap for explosion protection, that is as a path in which a gap can extinguish a spark which could, for example, ignite an explosive mixture without escaping from the motor. The bearing element 2 is a roller element bearing, in particular a ball bearing or a cylinder roller bearing. FIG. 1 shows two ball bearings and one cylinder bearing in a longitudinal axial direction.

A further peripheral gap 6 having a predefinable axial width between the bearing cover 32 and the rotor shaft 4 is additionally formed in the radial direction. The bearing arrangement 1 can be filled with a lubrication and cooling liquid for lubrication and/or cooling.

The invention claimed is:

1. A submersible pump comprising:
   a bearing arrangement including
      a bearing cover, a bearing flange, and
      a bearing element having an inner bearing ring, an outer bearing ring and a roller element; and
   a rotor shaft rotatably supported in the bearing element about an axis of rotation extending in a longitudinal axial direction so that the inner bearing ring is configured to rotate along with the rotor shaft in an operating state,
   the bearing element being arranged at the bearing flange such that the bearing cover compresses the outer bearing ring in a longitudinal axial direction and such that a peripheral gap having a predefined axial width is formed in a radial direction between the outer bearing ring and the bearing cover and between the outer bearing ring and the bearing flange, the peripheral gap being a spark gap capable of explosion protection.

2. A submersible pump in accordance with claim 1, wherein the bearing element is a roller element bearing.

3. A submersible pump in accordance with claim 1, wherein
the peripheral gap is a first peripheral gap, and a second peripheral gap having a predefinable axial width between the bearing cover and the rotor shaft is formed in the radial direction.

4. A submersible pump in accordance with claim 3, wherein the predefined axial width of the second peripheral gap is larger than or equal to 5 mm.

5. A submersible pump in accordance with claim 3, wherein a radial width of the second peripheral gap is less than or equal to 0.2 mm.

6. A submersible pump in accordance with claim 1, wherein the predefined axial width of the peripheral gap is larger than or equal to 5 mm.

7. A submersible pump in accordance with claim 1, wherein a radial width of the peripheral gap is less than or equal to 0.2 mm.

8. A submersible pump in accordance with claim 1, wherein the bearing element is one of a ball bearing and a cylinder roller bearing.

9. A bearing arrangement for a submersible pump, comprising:
a bearing cover;
a bearing flange; and
a bearing element having an inner bearing ring, an outer bearing ring and a roller element, the bearing element being configured to rotatably support a rotor shaft about an axis of rotation extending in a longitudinal direction so that the inner bearing ring is capable of rotating along with the rotor shaft in an operating state,
the bearing element being arranged at the bearing flange such that the bearing cover compresses the outer bearing ring in a longitudinal axial direction and such that a peripheral gap having a predefined axial width is formed in a radial direction between the outer bearing ring and the bearing cover and between the outer bearing ring and the bearing flange, the peripheral gap being a spark gap capable of explosion protection.

10. A bearing arrangement in accordance with claim 9, wherein the bearing element is a roller element bearing.

11. A bearing arrangement in accordance with claim 9, wherein the predefined axial width of the peripheral gap is larger than or equal to 5 mm.

12. A bearing arrangement in accordance with claim 9, wherein a radial width of the peripheral gap is less than or equal to 0.2 mm.

13. A bearing arrangement in accordance with claim 9, wherein the peripheral gap is a first peripheral gap, and a second peripheral gap having a predefined axial width is formed in the radial direction between the bearing cover and a rotor shaft in an operating state.

14. A bearing arrangement in accordance with claim 13, wherein the predefined axial width of the second peripheral gap is larger than or equal to 5 mm.

15. A bearing arrangement in accordance with claim 13, wherein a radial width of the second peripheral gap is less than or equal to 0.2 mm.

16. A submersible pump in accordance with claim 9, wherein the bearing element is one of a ball bearing and a cylinder roller bearing.

* * * * *